SELECTIVE RINGING CIRCUITS
Filed Nov. 18, 1954
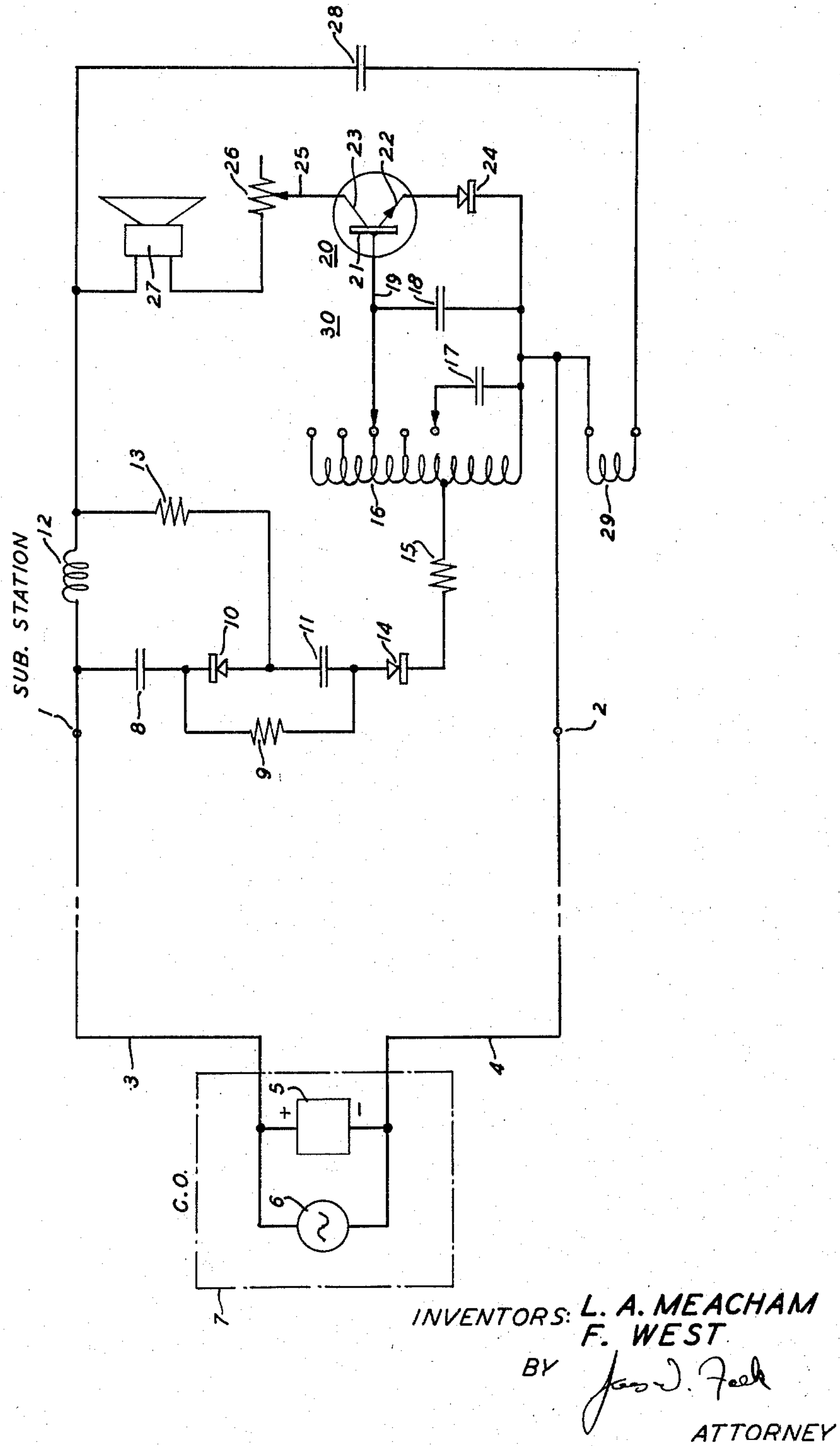
INVENTORS: L. A. MEACHAM
F. WEST
BY [signature]
ATTORNEY

United States Patent Office 2,824,175

Patented Feb. 18, 1958

2,824,175

SELECTIVE RINGING CIRCUITS

Larned A. Meacham, New Providence, and Fred West, Chatham, N. J., assignors to Bell Telephone Laboratories, Incorporated, New York, N. Y., a corporation of New York Application November 18, 1954, Serial No. 469,633

12 Claims. (Cl. 179—86)

This invention relates to signaling systems and more particularly to selective ringing circuits for multiparty telephone systems.

Telephone systems are known which provide for private ringing of a number of separate parties on a common line. One such ringing system is described in a copending application of L. A. Meacham, Serial No. 469,802, filed November 18, 1954, which discloses, in part, a multiparty frequency selective horn ringer circuit comprising a tuned circuit for providing selectivity, and a transistor amplifier including a biasing diode for providing a number of functions including amplification, amplitude gating and the generation of harmonics. A voltage limiter comprising a pair of diodes is connected in shunt with the tuned circuit and serves chiefly to improve selectivity by limiting the amplitude of the signal input to a standard voltage. A multiparty ringing circuit, as described in the above-mentioned Meacham application, advantageously may be employed in rural communities, such as in a rural carrier telephone system wherein it is desired to employ a low current voice frequency ringer, thereby allowing the ringing signal to be transmitted over the carrier and obviating the necessity of deriving a signal of conventional low frequency from local power at the pole-mounted carrier terminals.

It is a general object of this invention to provide an improved full selective low current ringing circuit. More specifically, it is an object of this invention to provide an improved frequency selective transistor ringing circuit for use in multiparty telephone systems.

It is a further object of this invention to provide a voice frequency ringing circuit capable of responding to a limited band of frequencies to allow signal frequency variation without reduction in sound level while at the same time discriminating against voice voltages and signal frequencies of the adjacent parties.

It is another object of this invention to provide such a selective ringing circuit having a relatively high Q filter for improved frequency discrimination.

It is a still further object of this invention to provide a multiparty ringer transistor amplifier in which the power output is independent of normal amplitude variations in signal voltage.

It is a still further object of this invention to control the volume of the audible signal output of a horn type voice frequency ringing circuit.

These and other objects are realized in one specific illustrative embodiment of this invention which comprises a transistor amplifier having an amplitude gate connected in series therewith. An antiresonant circuit tuned to the signaling frequency is connected to the input of the transistor amplifier. A current limiter network is connected in series with the antiresonant circuit and a coil for providing positive feedback is coupled to the antiresonant circuit. A volume control rheostat is connected between the transistor output and a horn type transducer for controlling the volume of the output signal.

At the resonant frequency, the impedance of the antiresonant circuit is high enough so that the input current from the limiter network produces a voltage of a desired minimum amplitude across the tuned circuit. This voltage is such that its peaks are sufficient to overcome the amplitude gate and cause the transistor amplifier to pass pulses of base current and corresponding amplified pulses of collector current. The base current pulses absorb power from the tuned circuit, tending to lower its impedance as the voltage increases, thus stabilizing the amplitude of this voltage.

Off resonance, the impedance of the antiresonant circuit is small compared to its value at resonance, with the result that the antiresonant circuit voltage is less than the amount necessary to cause conduction in the amplitude gate, and the transistor is inactive.

As the frequency of the input signal voltage moves slightly off resonance, the inherent impedance of the antiresonant circuit decreases rapidly. It follows that even though the voltage tends to be stabilized as described above, the power available to supply the pulses of base current to the transistor is reduced. At resonance these pulses are larger than necessary to drive the transistor to collector saturation and hence there is little change in the transistor output. This enables the amplifier to operate over a band of frequencies and reduces the requirements on the stability of the system. However, this band must not be allowed to increase, such as when large input signal voltages are applied, to such an extent that the amplifier will operate at the frequencies of the adjacent parties; in accordance with one aspect of this invention, a current limiter network is utilized in the input circuit to prevent this undesired increase in active bandwidth.

This limiter network comprises, inter alia, a pair of oppositely poled diode elements which normally are in the conducting state, i. e., when the peak signal current is less than or equal to the value of the direct current flow therein. Under these conditions the net current in the diodes is in the forward direction and their impedance is low. However, if the alternating current signal current tries to exceed the direct current value, the net current of one of the two diodes will be in the backward direction and the diode will be blocked or back biased. Similarly, on the other half of the alternating current signal wave the other diode will be blocked. Thus, the current limiter network serves to clip the peaks of the alternating current signal wave at an amplitude equal to the direct current value.

In the specific embodiment of the invention illustrated herein, the limiter network also serves to prevent the operation of the transistor amplifier on voice transients or other interference when the subset receiver is in the off hook condition. At this circuit condition, the carbon transmitter in the handset draws a large direct current which substantially reduces the direct current line voltage. The lower line voltage in turn reduces the direct current flow in the limiter so that the alternating current signal wave is clipped at a lower value to eliminate or at least considerably narrow the bandwidth over which the amplifier will operate.

The series limiter network has the added advantage over a parallel limiter, such as that disclosed in the Meacham application identified above, in that for normal line signal levels it provides a substantially constant current or infinite impedance source and thus affords an appreciably smaller reduction in the Q of the antiresonant circuit.

The power output of the transistor amplifier is made independent of the line signal voltage over the normal range of variation of the latter by providing sufficient gain so that the available pulses of base current are adequate to fully modulate the collector electrode. Although this much gain normally would require expensive and generally hard to obtain transistors having an alpha of over .99 in a simple amplifier circuit, the gain is obtained by the introduction of positive feedback in the amplifier through an additional coil winding connected in series with the transistor output and coupled to the coil of the antiresonant circuit. Thus, the pulses of collector current are made to compensate in part for the loading effect of the pulses of base current. With this arrangement the necessary gain is provided by transistors with alphas of a much lower value than that previously mentioned.

With the positive feedback employed, a transistor of exceptionally high alpha may cause the circuit to enter a state of self oscillation at the resonant frequency of the selective circuit. This is not found objectionable, because the oscillation only exists when a sufficiently strong input signal raises the effective impedance of the limiter by causing limiting to occur. When the signal on the line is interrupted, the feedback is insufficient to maintain oscillation in the presence of damping as imposed upon the antiresonant circuit by the idle limiter; hence the oscillation is also interrupted. Furthermore, the oscillation is found to lock in with the applied signal with the result that it has no appreciable effect upon the audible output.

Control of the volume of the audible signal produced by the transducer is provided in this specific illustrative embodiment of the invention by a variable resistor in series with the transistor collector electrode. By selective variation of the value of the resistance in series with the collector circuit, the amount of output voltage dissipated across the resistor is controlled to regulate the output voltage available for the transducer.

In accordance with one feature of this invention, a current limiter is employed in a voice frequency multiparty station set ringer. More specifically, it is a feature of this invention that the selectivity of a multiparty ringer is improved through the use of a current limiter circuit comprising a pair of oppositely poled diodes in series with a tuned transistor amplifier to limit the alternating current signal current to an amplitude equal to the direct current bias current for preventing operation of the amplifier at the adjacent signaling frequencies.

In accordance with a further feature of this invention a current limiter is provided in a multiparty ringer which acts to reduce the alternating current signal current when the receiver is in the off hook condition to narrow or eliminate the bandwidth over which the ringer will operate and prevent false operation due to voice transients.

In accordance with a still further feature of this invention the selectivity of a tuned transistor amplifier in a multiparty telephone system is improved by connecting a current limiter rather than a voltage limiter thereto so that the load imposed on the tuned circuit by the input is a relatively high impedance which results in appreciably less reduction in the Q of the tuned circuit.

It is a still further feature of this invention that the power output of a transistor ringer is rendered independent of normal variations in input signal voltage by providing positive feedback in the amplifier circuit so as fully to modulate the transistor collector electrode with minimum input signal voltage having maximum expected frequency deviations. Hence, in accordance with a feature of this invention, the gain necessary for this degree of modulation is obtained using transistors having low alphas, say as low as .97.

In accordance with another feature of this invention, there is provided a variable resistance connected between the transistor collector electrode and the transducer so that the subscriber may control the volume of the audible signal output by selectively adjusting the value of the variable resistance and therefore the amount of output voltage delivered to the transducer.

A complete understanding of this invention and of the above and other features thereof may be gained from consideration of the following detailed description and the accompanying drawing which is a schematic representation of one embodiment of a transistor-operated selective ringing circuit illustrative of the invention.

To facilitate the understanding of this invention, the disclosure has been simplified by omitting the talking paths and disclosing only the selective ringer portions of the circuitry at the subscriber's station. It is understood that those skilled in the art may readily add speech transmitting and receiving circuits and that any one of many known types of telephone station sets may be utilized.

Referring now to the drawing, the input terminals 1 and 2 connect the ringing circuit to the conductors 3 and 4 of the party line which in turn are connected to a source of direct current potential 5 and a source of ringing signals 6 in the central office 7. In accordance with one aspect of the invention, these ringing signals advantageously may be in the voice range, there being a signal of different frequency for each subscriber station connected to the party line.

Connected to the input terminals 1 and 2 is a current limiter network which comprises a capacitance 8 having one lead thereof connected to terminal 1 and the other lead connected to a resistance 9. Also connected to the capacitance 8 and in parallel with the resistance 9 is a diode element 10 connected in series with a capacitance 11. A choke coil 12 in series with a resistance 13 is connected between the input terminal 1 and the junction of the diode element 10 and the capacitance 11. The resistance 9 and the capacitance 11 are connected to a diode element 14 which is poled in opposition to the diode element 10. A resistance 15 is connected between the diode element 14 and an inductance 16 of the filter network 30. The inductance 16 has a plurality of taps to which may be connected either or both of a pair of capacitances 17 and 18. By this arrangement the filter network may be selectively tuned to any one of eight ringing frequencies. Advantageously, the filter network is adjusted to the ringing frequency assigned the subscriber station at the time the subset is installed, as described in the above-mentioned Meacham application.

The filter network 30 is connected by a lead 19 to the base electrode 21 of a transistor 20. The emitter electrode 22 of the transistor 20 is connected to one side of a bias element 24, which advantageously may be a semiconductor diode such as a silicon junction diode. The other side of the diode is connected to the capacitances 17 and 18, the inductance 16 and the input terminal 2. The collector electrode 23 of transistor 20 is connected to the arm 25 of a rheostat 26. A transducer 27, which may be of the horn type, as described in the above-mentioned Meacham application, is connected between the potentiometer 26 and the choke coil 12. The transducer 27 is also connected to one lead of a capacitance 28, the other lead of which is connected to one terminal of a coil 29. Coil 29 is coupled to the filter network coil 16 and is connected at its other terminal to the input terminal 2.

In the operation of the illustrative embodiment of the invention disclosed in the drawing, a direct current potential for supplying operating power to the transistor 20 is applied over the subscriber loop from the source of direct current potential 5 in the central office 7. The positive side of the line is connected to the input terminal 1 and the negative side of the line to the input terminal 2. The direct current circuit is then through the choke coil 12, the transducer 27 and the volume control potentiometer 26 to the transistor collector electrode 23. The biasing diode 24 is connected in the return circuit between the emitter electrode 22 and the input terminal 2.

Alternating current ringing signals of the resonant frequencies of the various subscriber stations on the party line are transmitted over the line from the signal voltage source 6 in the central office 7. The ringing signal current flows from terminal 1 through capacitance 8, diode 10, capacitance 11, diode 14, resistance 15 and a part of the winding of inductance 16 to terminal 2. Advantageously, diodes 10 and 14 are silicon diodes which have impedances of about 900 ohms each when in the conducting state. When the signal current is at the resonant frequency of the filter network the impedance of the input section of the inductance 16 is at its maximum value, with the result that the limited input current produces a corresponding maximum voltage across the coil. At this frequency, the positive peaks of the voltage across the antiresonant filter circuit exceed the forward voltage of the normally nonconducting biasing diode 24 and the excess causes the transistor 20 to pass pulses of base current which in turn produce amplified pulses of collector current. Due to the action of the biasing diode 24, the transistor circuit operates as a class C amplifier and produces pulses which are rich in harmonics and generate a complex tone in the transducer 27. The choke coil 12 and capacitance 28, acting as a power supply filter for the amplifier, prevent these pulses from being fed back to the loop conductors 1 and 2.

For signals away from the resonant frequency of the filter network, the impedance of the input section of the inductance 16 is greatly reduced so that the antiresonant circuit voltage has insufficient amplitude to overcome the biasing diode 24 and the transistor 20 is inactive.

As the line frequency moves slightly off resonance, the impedance of the filter network decreases rapidly. This causes a reduction in the amplitude of the base current pulses supplied to the transistor 20, but since these pulses normally are more than sufficient to drive the collector 23 to saturation, there is little change in collector voltage or current. The amplifier thus is responsive to signals ranging over a band of frequencies. Manifestly, this is desirable as it permits both the antiresonant circuit frequency and the line signal frequency to vary slightly from their nominal values without reduction in the sound level of the transducer output.

The frequency band over which the amplifier operates must be limited. In accordance with an aspect of this invention the current limiter in the input circuit prevents the band from increasing in the presence of large line signal voltages to such an extent that the amplifier will operate at the frequencies of the adjacent parties and cause false ringing.

This limitation is provided chiefly by the pair of diodes 10 and 14. In accordance with one embodiment of the invention in which 20 volts direct current is supplied over the subscriber loop from the direct current source 5 in the central office, approximately 60 microamperes of direct current flow through the pair of diodes via the choke coil 12 and the resistances 13, 9 and 15. As long as the peak alternating current signal current remains below this value, the net current in the diodes will be in the forward direction and the impedance of the diodes will be relatively low. However, if the alternating current signal current tries to exceed the value of the direct current flow, the net current in one or the other of the diodes will be in the backward direction and the diode will be blocked or back biased. Similarly, on the other half of the alternating current wave the other diode will be blocked. In this manner, the pair of diodes operate to clip the peaks of the alternating current signal current at an amplitude equal to the direct current. In the illustrative embodiment described above, the 60 microampere level was selected because it is low enough to prevent operation of the transistor at signals of the adjacent party frequencies while high enough to provide a satisfactory bandwidth.

The limiter network also provides protection against operation of the ringing circuit amplifier that may result due to voice voltages when the receiver is in the off hook condition. At this circuit condition the carbon transmitter in the handset draws a large direct current from the direct current source in the central office in a manner well known in the art. This large current results in the reduction of the direct current line voltage to less than one third of its normal or on hook value. The effect of this lowering of the direct current line voltage is to reduce the direct current in the limiter a proportionate amount, as, for example, to approximately 20 microamperes in the embodiment described heretofore. As a result, the peaks of the alternating current signal wave are clipped so that the amplitude of the signal current cannot exceed 20 microamperes. This lower current is insufficient to energize the antiresonant circuit to the point at which the amplifier will operate and thus prevents false operation due to voice or other voltages.

In one specific embodiment of current limiter as shown in the drawing, the values of the circuit elements may advantageously be 100,000 ohms for resistance 13, 4 microfarads for capacitance 11, .05 microfarad for capacitance 8, 240,000 ohms for resistance 9, 12.5 henrys for the choke coil 12, 4 microfarads for capacitance 28, and 8200 ohms for the resistance 15. Although the choke coil 12 and capacitance 28, used as a power supply filter as noted earlier, are not essential components of the limiter, advantage is taken of their presence by connecting resistor 13 to their common terminal, where filtered direct current potential is available. As explained heretofore, diodes 10 and 11 advantageously may have impedances of about 900 ohms each when in the conducting state. Thus, the load imposed by the series current limiter on the filter network 30 has an impedance ranging from many megohms at high signal levels to about 10,000 ohms at low levels, as compared with an impedance of about 2000 ohms at high and 10,000 ohms at low levels imposed by parallel voltage limiters of the type utilized in the copending Meacham application identified above. Therefore the Q of the filter network 30 is considerably higher in circuits in accordance with aspects of this invention to provide greater efficiency and selectivity for the ringing operation.

It is desirable that the power output of the amplifier and transducer be independent of any variation in the alternating current signal voltage. In circuits of the type described above this voltage normally may vary with such factors as loop length between 0.7 and 2.0 volts. Constant power output for input signals within this range may be accomplished by providing the amplifier with sufficient gain to fully modulate the collector electrode 23 of the transistor 20 with the limited signal current. In a simple amplifier this much gain normally would require a transistor with an alpha of over .99. Such transistors are expensive and generally not readily available at the present time. In the illustrative embodiment disclosed herein the necessary gain has been provided using transistors with alphas as low as .97 by introducing positive feedback into the amplifier through an additional winding 29 coupled to the inductance 16 of the filter network 30. This winding advantageously may have a turns ratio of about 1:50 with the inductance 16. The feedback winding is connected in the collector electrode circuit in series with the bypass capacitance 28 so that the alternating current signal component of the collector current flows through the feedback winding 29 and reinforces the input signal voltage induced in the filter network. The turns ratio and coupling are selected so that the collector electrode 23 is fully modulated with the minimum signal voltage, thus providing sound output which is always at or near maximum, regardless of input signal variation within the above-stated range.

The level of the sound output from the transducer 27 advantageously should be adjustable to the desires and requirements of the subscriber. A rheostat 26 which comprises a movable arm 25 is connected in series between the collector electrode 23 and the transducer 27. The series resistance of the rheostat may be varied by adjustment of the arm 25 selectively to increase or decrease the volume of the audible ringing signal. Increasing the value of resistance in the circuit, for example, increases the voltage drop across the rheostat to reduce the voltage available for the transducer 27 and thereby reduce the sound output.

As shown in the drawing the resonant frequency of the filter network 30 is adjustable in eight steps by various connections of the two capacitances 17 and 18 and the four taps on the inductance 16. We had found it advantageous for lines having eight subscribed stations thereon to employ frequencies of 478, 532, 591, 656, 729, 810, 900 and 1000 cycles per second. A geometric series with this 9 to 10 spacing has the desirable characteristic that the lower harmonics of one of the frequencies do not coincide with the fundamentals of any of the higher frequencies. This arrangement permits the use of frequencies of the same series extended above 1000 cycles for other signaling purposes without interference from the harmonics of subscriber calling.

As a steady ringing tone is generally monotonous and may be confused by the called party with tones from other sources, we have found it further advantageous to make the tone distinctive by interrupting it about 10 times per second. This interruption in the signal may be done at the central office by any of the means well known in the art for accomplishing this purpose.

As described and taught in the above-mentioned Meacham application, the inductance 16 may also comprise an element of the party line identification signal generator for generating a unique identification signal coincidentally with the generation of dial signals. In such a case the inductance 16 would be connected in the ringing circuit or line identification signal generating circuit depending on whether the subscriber telephone is in its on hook or off hook condition.

It is to be understood that the above-described arrangements are illustrative of the application of the principles of the invention. Numerous other arrangements may be devised by those skilled in the art without departing from the spirit and scope of the invention.

What is claimed is:

1. In a station set for use in a multiparty telephone system, a ringing circuit comprising a pair of conductors, a filter network connected to said pair of conductors, said filter network being tuned to a predetermined ringing signal frequency, signal amplifying and transducing means connected to said filter network responsive to ringing signals of said predetermined frequency received therefrom, and current limiter means connected in series relationship with said filter network for limiting the amplitude of the input signals applied thereto to aid the filter network in preventing response of the transducing means to signals other than the signals of said predetermined frequency.

2. In a station set for use in a multiparty telephone system, a ringing circuit in accordance with claim 1 wherein said current limiter means comprises a pair of series connected oppositely poled diode elements, and biasing means connected to said elements, said elements being in a conductive state for input signals less than a given amplitude and being in a nonconductive state for input signals greater than said given amplitude.

3. In a station set for use in a multiparty telephone system, a ringing circuit in accordance with claim 1 further comprising a choke element and a bypass capacitor for isolating the output circuit of said signal amplifying means from said pair of conductors.

4. In a station set for use in a multiparty telephone system, a ringing circuit in accordance with claim 1 wherein said signal amplifying and transducing means comprises a transistor including a base electrode, an emitter electrode and a collector electrode, a horn type transducer, and a volume control rheostat connected between said collector electrode and said transducer whereby the audible signal output of said transducer may be selectively controlled.

5. A subscriber set for employment in multiparty telephone systems comprising ringing means responsive to a signal of a given frequency for producing an audible ringing signal, said ringing means including a filter network including a first inductance and a capacitance, the values of said inductance and capacitance being such to tune the filter network to said given frequency, a transistor connected to said filter network, said transistor comprising a base electrode, an emitter electrode and a collector electrode, a transducer connected to said collector electrode and a second inductance connected between said transducer and said filter network and coupled to said first inductance for providing positive feedback to thereby permit the use of relatively low gain transistors.

6. A multiparty telephone system comprising a central office, a source of direct current potential in said central office, a source of ringing potentials in said central office, there being a ringing potential of distinct frequency for each station in the multiparty system, a pair of conductors connecting each station with said central office, each station comprising a filter network connected to said pair of conductors tuned to the frequency of one of the ringing potentials, amplifying and transducing means connected to the filter network and responsive to output signals therefrom, and a current limiter circuit connected in series with said filter network, said current limiter comprising means for conducting a direct current and means for maintaining the signal current at a level equal to or below the level of the direct current to prevent the amplifying and transducing means from responding to signals other than signals of the frequency of the filter network.

7. A multiparty telephone system in accordance with claim 6 wherein said current limiter comprises a first diode and a second diode, connected in opposition, said diodes being in the conducting state when the signal current is equal to or below the level of the direct current and being blocked when the signal current exceeds the level of the direct current.

8. A multiparty telephone system in accordance with claim 6 wherein said amplifying means comprises a transistor having base, emitter and collector electrodes.

9. A multiparty telephone system in accordance with claim 8 further comprising means connected in circuit with the collector electrode to provide positive feedback of the transistor output to enable a high gain to be obtained from said amplifying means.

10. In a multiparty telephone system, a pair of line conductors, ringing means, signal amplifying means connected to said ringing means for causing said ringing means to generate an audible signal, a filter network responsive to a particular signal frequency connected to said signal amplifying means for operating said amplifying means on receipt of signals of said frequency over said pair of conductors, and a current limiter circuit connected in series with said filter network, said filter network and said current limiter circuit being connected across said pair of conductors and said current limiter circuit including a pair of oppositely poled diodes connected in series opposition between one of said conductors and said filter network, and a resistor having one end connected to said one conductor and its other end connected between said oppositely poled diodes.

11. In a multiparty telephone system in accordance with claim 10, said current limiter circuit further including a first condenser connected between said one conductor and the first of said diodes and a second condenser connected between said diodes.

12. In a multiparty telephone system in accordance with claim 11, said current limiter circuit further including choke means connected in said first conductor between said first condenser and said resistor, and a second resistor connected in shunt across said first diode and said second condenser whereby distinct direct current and alternating current paths are provided through said current limiter circuit.

References Cited in the file of this patent

UNITED STATES PATENTS 2,666,812 Kircher ---------------- Jan. 19, 1954